United States Patent
Kaplan et al.

(10) Patent No.: US 11,284,365 B2
(45) Date of Patent: Mar. 22, 2022

(54) TIME SYNCHRONIZATION OVER REDUNDANT AND DETERMINISTIC SWITCH-BASED AVIONICS NETWORKS

(71) Applicant: Rockwell Collins, Inc., Cedar Rapids, IA (US)

(72) Inventors: Daniel J. Kaplan, Melbourne Beach, FL (US); Yeshani D. WijesekaraGamachchige, Melbourne, FL (US); Andrea P. Gonzalez, Melbourne, FL (US); Christopher A. Hohensee, Palm Bay, FL (US); Angelo J. Joseph, Melbourne, FL (US); Nels Waineo, Marion, IA (US); Christopher Kistler, Cedar Rapids, IA (US); Jason R. Owen, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 153 days.

(21) Appl. No.: 16/664,351

(22) Filed: Oct. 25, 2019

(65) Prior Publication Data
US 2021/0235405 A1    Jul. 29, 2021

(51) Int. Cl.
*H04W 56/00* (2009.01)
*B64D 45/00* (2006.01)
(Continued)

(52) U.S. Cl.
CPC ........ *H04W 56/0015* (2013.01); *B64D 45/00* (2013.01); *G06F 1/12* (2013.01);
(Continued)

(58) Field of Classification Search
CPC ... H04L 63/145; H04L 12/18; H04L 67/1095; H04B 7/18502; H04W 72/0446; H04W 4/06; G06F 13/368
See application file for complete search history.

(56) References Cited

U.S. PATENT DOCUMENTS

| 7,656,751 B2 | 2/2010 | Rischar et al. |
| 8,265,042 B1 | 9/2012 | Nguyen et al. |
(Continued)

FOREIGN PATENT DOCUMENTS

| CN | 109150357 A | 1/2019 |
| EP | 2566077 B1 | 3/2018 |

OTHER PUBLICATIONS

Search Report for European Application No. 20203925.1 dated Mar. 12, 2021, 11 pages.

*Primary Examiner* — Iqbal Zaidi
(74) *Attorney, Agent, or Firm* — Suiter Swantz pc llo

(57) ABSTRACT

A system for time synchronization over redundant switch-based avionics networks is disclosed. The system includes a master or source clock for determining precise UTC timing information from received satellite signals and generating time marks based on the timing information. The source clock generates network-compatible timing messages and forwards the timing messages to network switches within the switch-based avionics networks. The network switches modify the timing information to account for switch-based delays and forward the modified timing messages to destination clocks in aircraft end systems. The end systems relay timing messages back to the source clock via the network switches, the timing information again modified by the network switches according to switch-based delays, and based on the precise timing information exchanged destination clocks in end systems throughout the switched network can precisely synchronize to the source clock.

14 Claims, 4 Drawing Sheets

(51) Int. Cl.
*G06F 1/12* (2006.01)
*G06F 1/14* (2006.01)
*G06F 13/40* (2006.01)

(52) U.S. Cl.
CPC ............ *G06F 1/14* (2013.01); *G06F 13/4022* (2013.01); *H04W 56/004* (2013.01); *H04W 56/0055* (2013.01)

(56) References Cited

U.S. PATENT DOCUMENTS

| | | | |
|---|---|---|---|
| 8,649,303 B2 * | 2/2014 | Danet | G06F 13/385 370/276 |
| 9,872,263 B1 | 1/2018 | Guthrie et al. | |
| 10,129,844 B2 | 11/2018 | Wang et al. | |
| 10,270,567 B1 | 4/2019 | Rang et al. | |
| 2014/0348186 A1 | 11/2014 | Ogata et al. | |
| 2016/0170439 A1 | 6/2016 | Aweya | |
| 2019/0097746 A1 * | 3/2019 | Timm | H04W 72/0446 |
| 2019/0373464 A1 * | 12/2019 | Chari | H04L 41/12 |

* cited by examiner

TIME SYNCHRONIZATION OVER REDUNDANT AND DETERMINISTIC SWITCH-BASED AVIONICS NETWORKS

TECHNICAL FIELD

The inventive concepts disclosed herein are directed generally to avionics networks and more particularly to communication of precise timing information over specific types of avionics networks.

BACKGROUND

Onboard avionics networks can interconnect a diverse array of aircraft subsystems, e.g., aircraft sensors, power subsystems and components, navigational equipment, flight control systems. For these diverse subsystems to coordinate effectively inflight, and to manage safety-critical inflight operations, application timing throughout the network should be synchronized as precisely as possible. This is not only true for avionics networks, of course; for a network of autonomous vehicles to function efficiently and safely, time delays and the corresponding state estimation errors must be avoided (e.g., two proximate autonomous vehicles may exchange position information dozens of times, if not more, every second). Commercial aircraft, for example, may incorporate a position receiver capable of acquiring accurate Coordinated Universal Time (UTC) from a constellation of satellites. This precise timing information may be distributed by the receiver to other network nodes, e.g., via ARINC 429 compatible time mark signals. However, while this approach may work for smaller point-to-point wired networks, it does not scale up to broad Ethernet-based avionics networks. For example, the expansion capability of ARINC 429 compatible wired networks (e.g., two-wire twisted pair) is limited compared to Ethernet-based networks. Further, the ARINC 429 time mark must be distributed to every network node to synchronize network messages and application operations with specific time instances.

SUMMARY

A system for time synchronization over redundant and deterministic switch-based avionics networks is disclosed. In embodiments, the time synchronization system includes an aircraft-based source clock configured for receiving satellite-based navigational signals and for updating a precise source time based on the received signals (e.g., GPS or other types of GNSS signals). The source clock generates timing messages in an appropriate format for the switch-based avionics networks and forwards the timing messages to network switches via the switch-based networks, while receiving modified delay requests from the network switches. The network switches receive the delay requests from end systems, e.g., aircraft subsystems in communication with the switch-based network. The network switches modify the received timing messages and delay requests before forwarding the modified messages and requests to the end systems and source clock respectively. The end systems synchronize their local system times based on the source timing information included in the modified timing messages and generate the delay requests in response.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
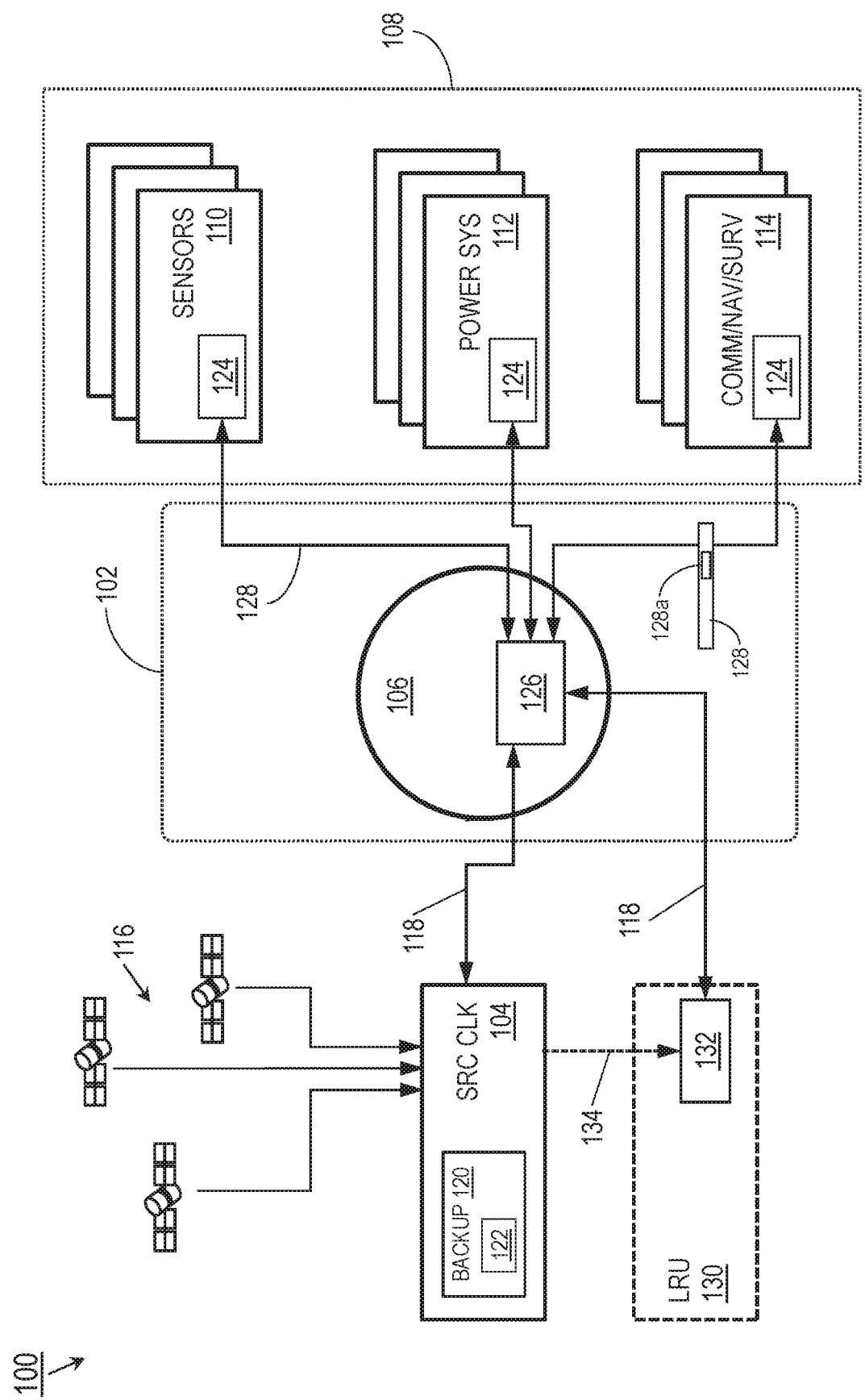
FIG. 1 is a block diagram illustrating a time synchronization system in accordance with example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Referring to FIG. 1, a time synchronization system 100 for accurate communication of precise timing information throughout a switch-based avionics network 102 is disclosed. The time synchronization system 100 may include a source clock 104, network switches 106, and end systems 108.

In embodiments, the switch-based avionics network 102 may be an Ethernet-based network with redundant or deterministic characteristics, e.g., according to ARINC 664. Each network switch 106 may connect the avionics network 102 to several types of end systems 108, e.g., aircraft sensors 110, power subsystems and components 112, communications, navigational, and/or surveillance (CNS) systems 114, or other aircraft subsystems. For example, a network switch 106 and its component end systems 108 may define a local subset (e.g., a Local Area Network (LAN) or region of the avionics network 102 as a whole (e.g., a Wide Area Network (WAN)).

In embodiments, the source clock 104 (e.g. master clock) may be embodied in a multi-mode receiver capable of receiving positioning and timing signals from one or more satellite constellations, e.g., Global Positioning System (GPS) and other Global Navigation Satellite System (GNSS) constellations 116. Based on the received signals, the multimode receiver may determine a highly precise and accurate position of the receiver and its embodying aircraft, as well as a timing standard based on Coordinated Universal Time (UTC) and capable of synchronizing the source clock 104 to satellite-based atomic clocks and determining precise timing information accurate to within nanoseconds. In some embodiments, the source clock 104 may incorporate a backup clock 120, which may draw auxiliary power from a backup battery 122 or similar power source independent of aircraft power sources (e.g., supercapacitors or other energy storage devices capable of storing enough energy to last a typical off-cycle while the aircraft is shut down, e.g., overnight). For example, the backup battery 122 may supply power to the backup clock 120 if no other power is available from an aircraft power source, e.g., if the aircraft is shut down. The backup clock 120 may include processors capable of updating a backup time based on the updated source time, and maintaining and storing the updated backup time (or the updated source time) to memory or other data storage, e.g., in the event of a GNSS outage. For example, the embodying aircraft may be shut down and restarted, in which case the source clock 104 may experience a delay in reacquiring timing signals from the satellite constellations 116. The backup clock may use its stored timing information to execute startup procedures (e.g., security validation) that may otherwise require precise UTC timing otherwise unavailable to the source clock 104, maintaining coordination with proximate aircraft and ground control facilities.

In embodiments, the source clock 104 may communicate precise timing information to every end system 108 on the switched network 102, enabling the end systems to more effectively operate independently or in coordination. For example, exterior cameras, light detection and ranging (LIDAR) subsystems, and other sensing subsystems may be accurately fused with navigational and positioning information to drive accurate, safety-critical synthetic vision and enhanced vision systems. Additionally, uninterruptible power supplies may provide accurate warnings of impending power loss to downstream line replaceable units (LRU), and synchronized timestamping within the LRU event logs enable precise understanding of a sequence of system or subsystem failures. Further, communication systems (e.g., VHF-band or HF-band radio systems) may operate more efficiently through time-division multiplexing (TDM) with enhanced accuracy.

In embodiments, the source clock 104 may continually receive timing signals from the satellite constellations 116 and continually determine precise timing information therefrom. The source clock 104 may conventionally distribute precise timing information via a time mark (e.g., a 1 pulse per second (PPS) discrete signal carrying an ARINC 429 compatible timing message), but this time mark may not be compatible with the switch-based (e.g., Ethernet-based) avionics network 102. Accordingly, the source clock 104 may distribute precise timing information to the network switches 106 by generating timing messages 118 in an Ethernet-compatible format, or any appropriate message format compatible with the switch-based avionics network 102. The network switches 106 may in turn distribute the timing messages 118 to destination clocks 124 (e.g., slave clocks) in their client end systems 108 despite jitter or other variations in packet transmission timing throughout the switched network 102. Each destination clock 124 may synchronize itself to the source clock 104 based on the precise timing information.

In embodiments, each network switch 106 may include a switch processor 126 capable of relaying the precise timing information from the source clock 104 to each destination clock 124 via the switched network 102. For example, the source clock 104 and each destination clock 124 may exchange timing messages, similarly to the IEEE 1588 Precision Time Protocol (PTP) but compatible with the switching network 102. For example, the source clock 104 may send a synchronization message (e.g., a timing message 118) at a time $T_1$, which a destination clock 124 receives at a subsequent time $T_2$. (The source clock 104 may send a follow-up message to the destination clock 124 including the precise value of $T_1$.) The destination clock 124 may respond by sending a delay request message at a time $T_3$, which the source clock 104 receives at a time $T_4$; the source clock may then send the value of $T_4$ to the destination clock via a delay response message. Based on the values of $T_1$, $T_2$, $T_3$, and $T_4$, the destination clock 124 may then determine the offset of the destination clock relative to the source clock 104 as well as the propagation delay between the source and destination clocks.

In embodiments, relaying the timing message 118 from the source clock 104 to the destination clocks 124 through the switched network 102 (via the switch processor 126 of the network switch 106) may introduce a delay associated with the network switch 106. The switch processor 126 may account for this delay in generating a modified timing message 128 (based on the timing message 118) for distribution to the destination clocks 124 throughout the switched network 102. The switch processor 126 may modify the precise timing information within the message payload 128a of the modified timing message 128, to account for the additional delay, e.g., between the transmission of the timing message 118 (e.g., the synchronization message) by the source clock 104 and the reception of the modified timing message by a particular destination clock 124. For example, the network switch 106 may hold the timing message 118 briefly before relaying the modified timing message 128 to the destination clocks 124, modifying the message payload 128a to account for the additional delay. In some embodiments, the network switch 106 (e.g., the Ethernet physical (PHY) and/or media access control (MAC) layer) may perform hardware timestamping, modifying the message payload 128a to account for the time difference associated with the ingress of the timing message 118 and the egress of the modified timing message 128 relative to the network switch. In some embodiments, the message payload 128a may be associated with a different level of the network stack, if the architecture of the network switch 106 (or the switched network 102) precludes modification of the message payload.

In embodiments, the switch processor 126 of the network switch 106 may similarly modify the message payloads of delay request messages sent by a destination clock 124 in response to the modified timing message 128. Based on the exchange of messages between the source clock 104 and destination clocks 124, and the precise timing information contained therein, each destination clock 124 may synchronize itself to the source clock 104.

In some embodiments, the network switch 106 may operate similarly to a transparent clock. For example, as noted above, the network switch 106 may receive timing messages 118 from the source clock 104 and relay the precise timing information therein to the destination clocks 124 (e.g., destination clocks within the same region or LAN as the embodying network switch 106), modifying the message payload 128a of the timing message (128) to account for any delays associated with the network switch. A destination clock 124 of one end system (e.g., a sensor subsystem 110) may synchronize its local time based on the received modified timing message 128. The destination clock 124 may then relay the synchronized local time back to the network switch 106 (or to other network switches within the switch-based avionics network 102). The network switch 106 may then pass the received synchronized local time to other proximate end systems 108 (e.g., power subsystem 112, CNS subsystem 114). The destination clocks 124 within these proximate end systems 112, 114 may then synchronize their own local system times based on the synchronized system time received from the sensor subsystem 110 via the network switch 106 (which may modify the synchronized system time to account for any switch-based delays).

In some embodiments, the time synchronization system 100 may include one or more intermediary line replaceable units 130 (LRU) capable of interfacing with the switch-based network 102. For example, there may be no Ethernet-compatible interface between the source clock 104 and the switch-based network 102, which the ARINC 664-compatible intermediary LRU 130 may provide. Accordingly, the intermediary LRU 130 may incorporate an internal clock 132 capable of serving as a master clock for the system 100. For example, the internal clock 132 may receive a time mark 134 (e.g., an ARINC 429 compatible time mark, as described above) from the source clock 104 and, based on the received time mark, generate the network-compatible timing message 118 for the network switch 106. Similarly, the intermediary LRU 130 may relay modified delay requests between the network switch 106 and the source clock 104. In some embodiments, the time synchronization system 100 may include multiple implementations of the source clock 104 and/or the intermediary LRU 130.

Figure 2A:
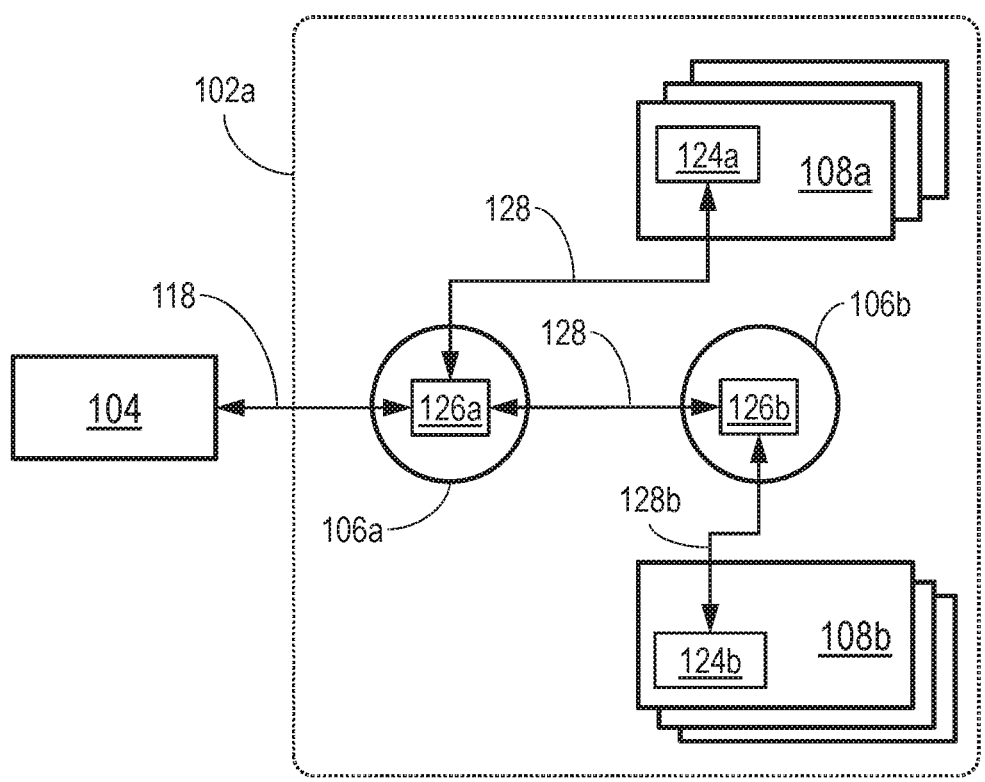
FIGS. 2A and 2B are block diagrams illustrating the time synchronization system of FIG. 1.

Referring now to FIG. 2A, the time synchronization system 100a may be implemented and may function similarly to the time synchronization system 100 of FIG. 1, except that the time synchronization system 100a may incorporate a switched network 102a wherein a timing message 118 transmitted by the source clock 104 may be transmitted through the switched network via more than one network switch 106a-b.

In embodiments, the switch processor 126a of the network switch 106a may generate a modified timing message 128 based on a timing message 118 received from the source clock 104 (e.g., by modifying the timing message based on a time delay (e.g., switch delay, hold delay) associated with the network switch 106a), and transmit the modified timing message 128 directly to a destination clock 124a of an end system 108a. In some embodiments, the network switch 106a may (additionally or alternatively) pass the modified timing message 128 to a subsequent network switch 106b. The switch processor 126b of the subsequent network switch 106b may further modify the received modified timing message (128b) based on any additional delays associated with the network switch 106b, passing the modified network timing message 128b on to other end systems 108b, whose destination clocks 124b may synchronize themselves to the source clock 104 based on the precise timing information included within the modified network timing message.

Figure 2B:
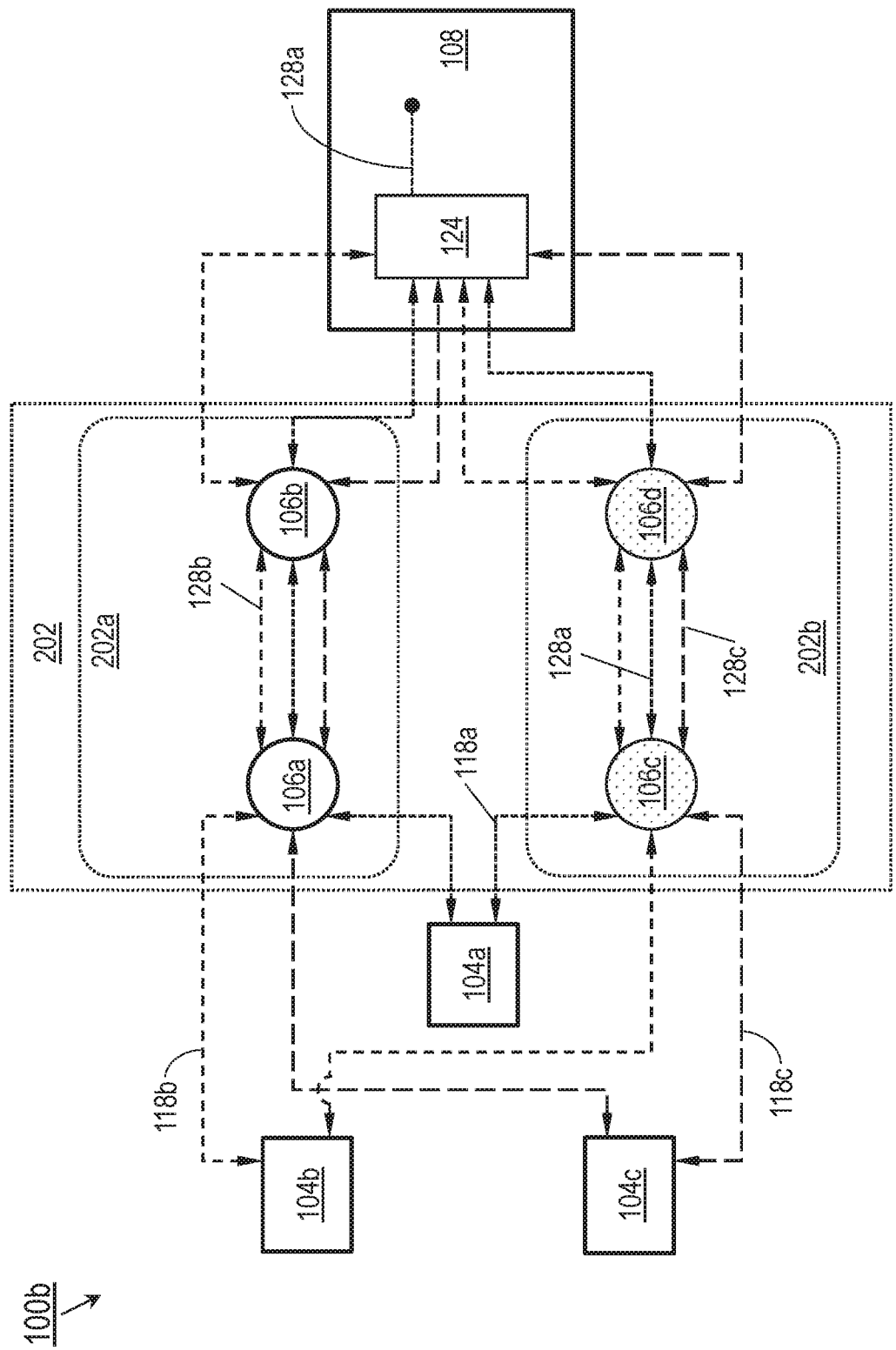

Referring now to FIG. 2B, the time synchronization system 100b may be implemented and may function similarly to the time synchronization systems 100, 100a of FIGS. 1 and 2A, except that the time synchronization system 100b may incorporate a redundant switched network (202) comprising a primary network 202a and one or more duplicate networks 202b. Similarly, the time synchronization system 100b may incorporate multiple source clocks 104a-c (e.g., reflecting numerous GNSS-enabled devices in communication with the redundant switched network 202).

In embodiments, each of the primary network 202a and the duplicate networks 202b may be independent LANs; the redundant switched network 202 may be configured for transmission of timing messages 118a-c and modified timing messages 128a-c via the primary network 202a alone, or for simultaneous transmission via the primary network 202a and duplicate networks 202b. For example, each of the source clocks 104a-c may transmit timing messages 118a-c through both the primary and secondary networks 202a, 202b. Accordingly, the destination clock 124 may receive multiple modified timing messages 128a-c, all of which should be identical with respect to their precision timing information. If, for example, any discrepancies are found within the received modified timing messages 128a-c, the destination clock 124 may select a "correct" modified timing message 128a (e.g., and correspondingly a "correct" source clock 104a). In some embodiments, based on identified discrepancies within received modified timing messages 128a-c (e.g., a modified timing message 128c received from the network switch 106d contains anomalous timing information), the destination clock 124 may identify or report a potential network failure (e.g., within the secondary network 202b via which the modified timing message was transmitted) or a fault associated with the originating source clock 104c.

In some embodiments, the redundant switched network 202 may be embodied in a safety-critical avionics environment wherein each duplicate network 202b provides a backup or alternate path for precise timing information derived by the source clock 104 to reach end systems 108 in the event of a shutdown or fault associated with the primary network 202a. For example, the duplicate network 202b may include network switches 106c-d; the network switch 106c may receive each timing message 118 and generate a modified timing message 128 therefrom, according to a switch delay (e.g., hold delay, hardware delay) equivalent to the delay associated with its counterpart network switch 106a. Similarly, the network switch 106d may further modify the modified timing message 128 into a subsequent modified timing message (128c) equivalent to that transmitted by its counterpart network switch 106b. Accordingly, the end system 108 may receive duplicate redundant modified timing messages 128c, e.g., accepting the first valid message received and removing any subsequent modified timing messages 128c. The destination clock 124 of the end system 108 may synchronize its local system time to the source clock 104 based on the precise timing information contained within the accepted modified timing message 128c.

Figure 3:
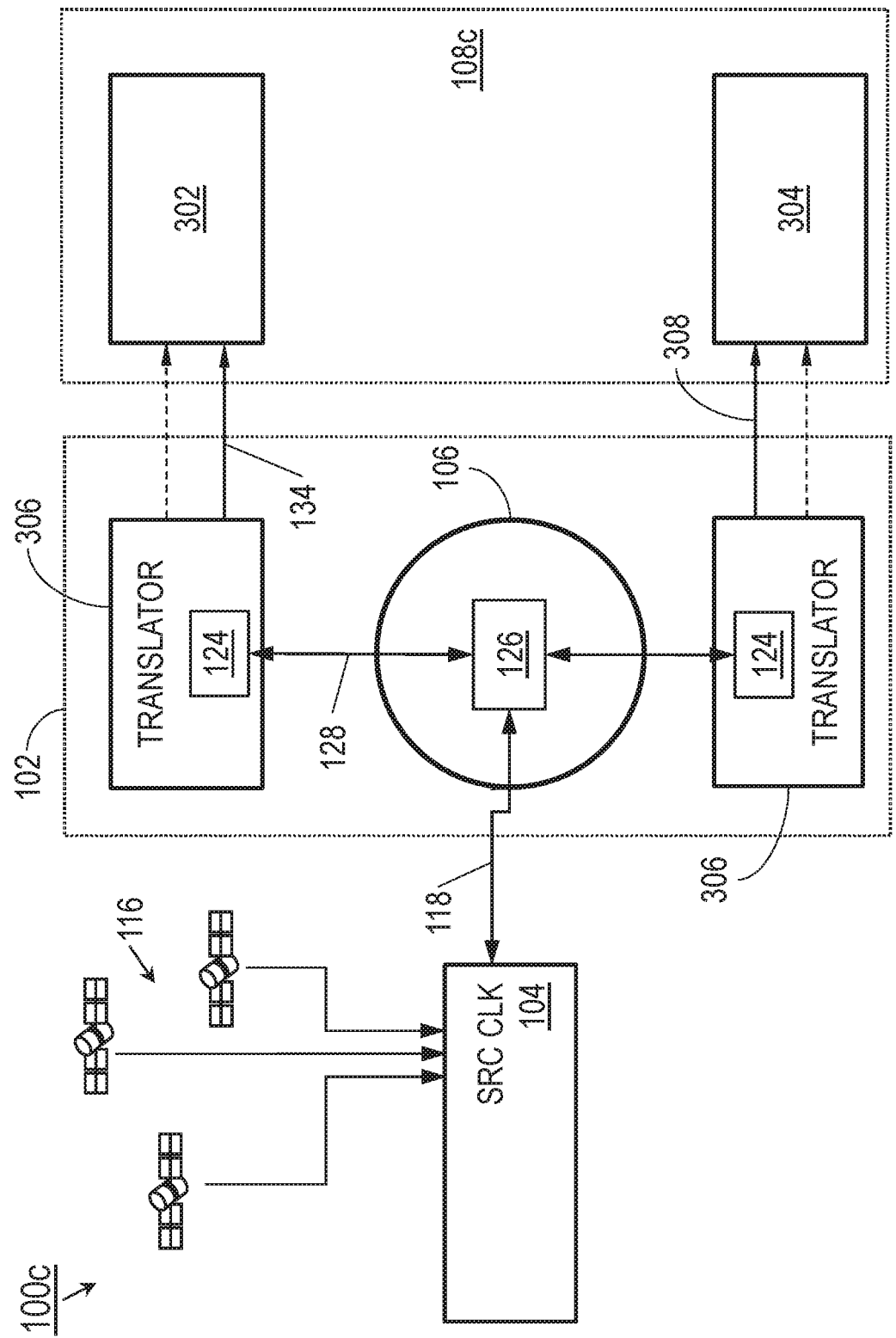
FIG. 3 is a block diagram illustrating the time synchronization system of FIG. 1.

Referring now to FIG. 3, the time synchronization system 100c may be implemented and may function similarly to the time synchronization systems 100, 100a-b of FIGS. 1 through 2B, except that the time synchronization system 100c may include legacy end systems 108c incorporating legacy LRUs 302, 304 without ARINC 664 interfaces or other interfaces compatible with the switch-based avionics network 102.

In embodiments, the switch-based avionics network 102 may include network translators 306 within which the destination clocks 124 may be housed. For example, when the destination clock 124 of a network translator 306 receives a modified timing message 128 from the network switch 106, the network translator may convert the network-compatible timing information within the modified timing message 128 into a legacy format compatible with the legacy LRUs 302, 304. For example, the legacy LRU 302 may be compatible with ARINC 429 time marks (134), while the legacy LRU 304 may be compatible with inter-range instrumentation group (IRIG) timecodes 308.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A system for time synchronization over switch-based avionics networks, comprising:
   at least one source clock installable aboard an aircraft, the source clock associated with a source time and configured to:
   receive at least one timing signal from a navigational satellite;
   update the source time based on the timing signal;
   generate at least one timing message based on the updated source time, the timing message associated with a message format compatible with at least one redundant network;
   and
   receive at least one modified delay request;
   the source clock comprising:
   at least one backup clock associated with a backup time, the backup clock configured to:
   update the backup time based on the updated source time;
   and
   store the updated backup time to a memory; and
   at least one auxiliary power source coupled to the backup click, the auxiliary power source configured to supply operating power to the backup clock;
   at least one network switch in communication with the source clock and with the at least one redundant network, the network switch configured to:
   receive the timing message from the source clock;
   receive a delay request from at least one end system via the redundant network;
   modify at least one of the received timing message or the received delay request;
   relay the modified timing message to the at least one end system via the redundant network;
   and
   relay the modified delay request to the source clock;
   and
   each of the at least one end system including at least one destination clock in communication with the network switch and associated with a system time, the destination clock configured to:
   receive the modified timing message from the network switch;
   generate the delay request in response to the modified timing message;
   and
   synchronize the system time according to the source time based on one or more of the modified timing message or the delay request.

2. The system for time synchronization of claim 1, wherein the at least one end system includes at least one of an aircraft sensor, an aircraft power system, a communications component, a navigational component, and a surveillance component.

3. The system for time synchronization of claim 1, wherein the end system is a first end system, and:
   the end system is configured to relay the synchronized system time to the network switch;
   and
   the network switch is configured to relay the synchronized system time to at least one second end system via the redundant network.

4. The system for time synchronization of claim 3, wherein:
   the second end system is associated with a second system time and configured to synchronize the second system time according to the relayed synchronized system time.

5. The system for time synchronization of claim 3, wherein the network switch is a first network switch, and:
   the network switch is configured to relay the synchronized system time to at least one second network switch via the redundant network.

6. The system for time synchronization of claim 1, wherein the network switch is configured to modify at least one of the network timing message and the delay request based on at least one time delay corresponding to the network switch.

7. The system for time synchronization of claim 6, wherein the at least one time delay includes at least one of a hold delay and a switch delay associated with a hardware timestamp.

8. The system for time synchronization of claim 1, wherein the timing message includes at least one of:
   a synchronization message;
   a follow-up message associated with a transmission time of the synchronization message;
   or
   a delay response associated with a reception time of the modified delay request.

9. The system for time synchronization of claim 1, wherein the message format is a first message format, further comprising:
   at least one line replaceable unit (LRU) coupled to the source clock by a physical data bus and coupled to the at least one network switch via a network interface, the LRU configured to:
      receive a time mark from the source clock, the time mark associated with a second message format incompatible with the at least one redundant network;
      generate the timing message based on the received time mark;
      and
      relay at least one of the timing message and the modified delay request between the source clock and the network switch.

10. The system for time synchronization of claim 1, wherein the message format is a first message format, further comprising:
    at least one legacy end system associated with a second message format incompatible with the at least one redundant network;
    and
    at least one network translator in communication with the network switch and with the at least one legacy end system, the network translator including at least one destination clock configured to:
       receive the modified timing message from the network switch;
       generate the delay request in response to the modified timing message;
       synchronize the system time according to the source time based on one or more of the modified timing message and the delay request;
       convert the modified timing message into the second message format;
       and
       transmit the converted timing message to the legacy end system.

11. The system for time synchronization of claim 1, wherein:
    the redundant network includes a first network and at least one duplicate network;
    the timing message includes a primary timing message sent via the first network and at least one duplicate timing message sent via the duplicate network;
    and
    the delay request includes a primary delay request sent via the first network and at least one duplicate delay request sent via the duplicate network.

12. The system for time synchronization of claim 1, wherein the source clock is a first source clock, and the destination clock is configured to:
    receive a first modified timing message corresponding to the first source clock and at least one second modified timing message corresponding to the second source clock;
    select a correct modified timing message from the first modified timing message and the at least one second modified timing message, the correct modified timing message corresponding to a correct source time;
    and
    synchronize the system time according to the correct source time.

13. The system for time synchronization of claim 12, wherein the destination clock is configured to:
    identify at least one anomalous modified timing message based on the first modified timing message and the at least one second modified timing message;
    detect at least one fault corresponding to the anomalous modified timing message, the fault including at least one of:
       a device fault associated with the corresponding source clock;
       or
       a network fault associated with the redundant network.

14. The system for time synchronization of claim 1, wherein the auxiliary power source includes at least one of a battery or a capacitor.

* * * * *